July 19, 1938.  M. M. SIMPSON  2,123,972
WEEDER
Filed Dec. 31, 1936   2 Sheets-Sheet 1
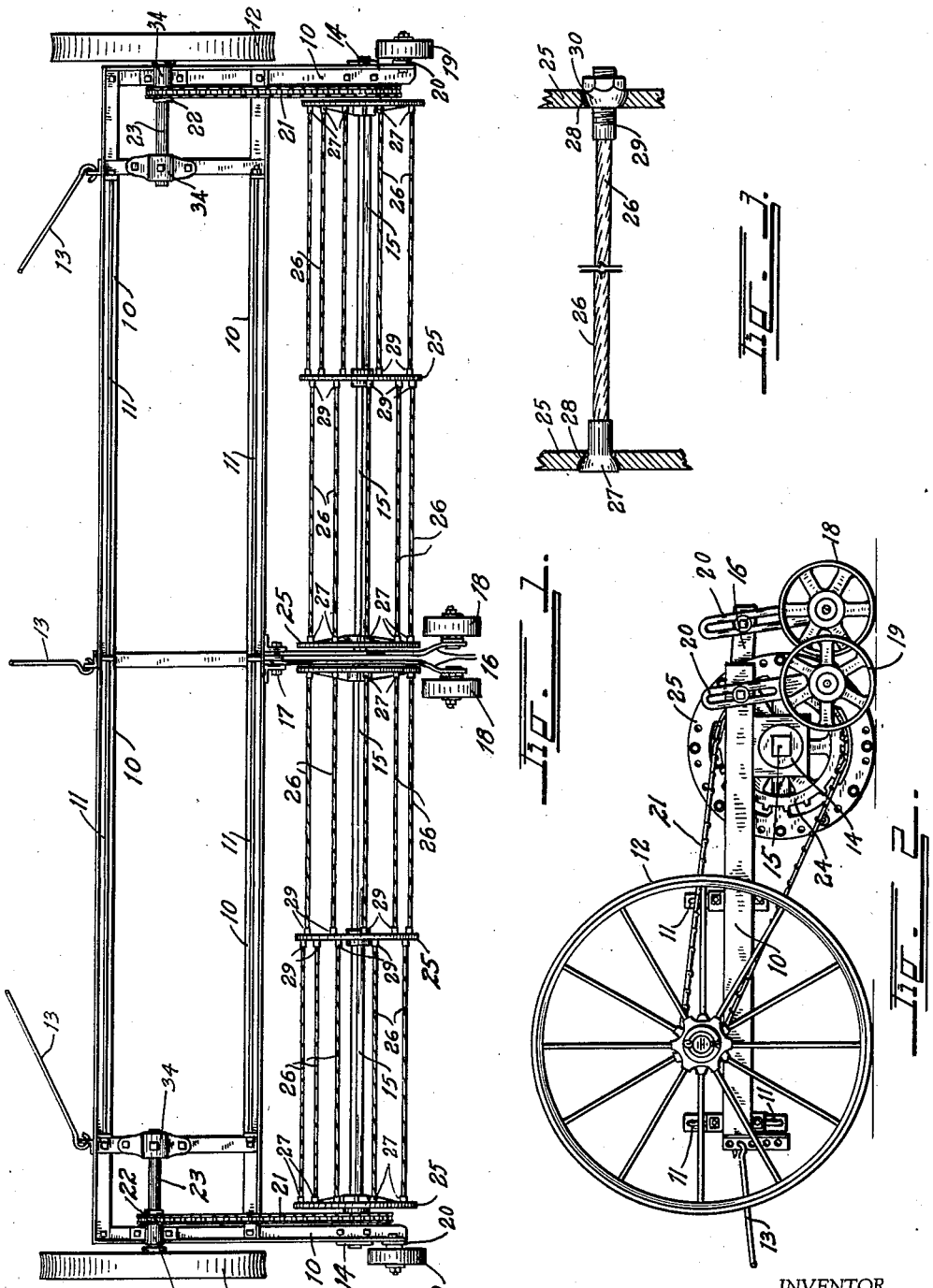
INVENTOR.
MELVIN M. SIMPSON
BY
ATTORNEY.

July 19, 1938. M. M. SIMPSON 2,123,972
WEEDER
Filed Dec. 31, 1936 2 Sheets-Sheet 2

INVENTOR.
MELVIN M. SIMPSON
BY
ATTORNEY.

Patented July 19, 1938

2,123,972

UNITED STATES PATENT OFFICE 2,123,972

WEEDER

Melvin M. Simpson, Sidney, Nebr.

Application December 31, 1936, Serial No. 118,528

7 Claims. (Cl. 97—144.1)

This invention relates to a weeder and has for its principal object, the provision of a highly efficient weeding machine which, when drawn over plowed or cultivated land, will engage and pull the weeds out by the roots and leave them uprooted on the surface to dry out.

Other objects of the invention are to provide a weeder which can be drawn with a minimum of power; which will not break off the roots of the weeds, but will pull them out in their entirety; which will lift trash, etc. from beneath the ground surface and leave it upon the top where it can be easily raked away; which will not break up the clods or pulverize the top soil so as to allow it to be blown away by wind action; and which will have a minimum of moving and wearing parts so that it will be economical to build and maintain.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:—

Fig. 1 is a plan view of the simple form of the improved weeder.

Fig. 2 is a "left" end view thereof.

Fig. 3 is a detail view illustrating the cable attachment mechanism.

Figure 4:
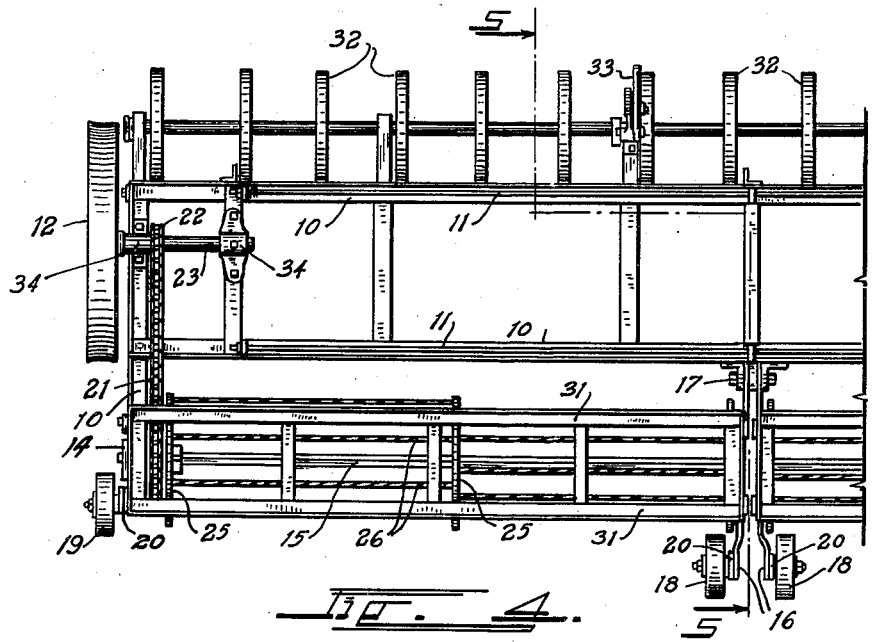
Fig. 4 is a partial plan view illustrating an alternate arrangement of the weeder for use in extremely hard top soil.

The invention comprises: a relatively wide supporting frame 10, braced by means of suitable truss rods 11. At each extremity of the frame 10 an axle stub 23 mounted in suitable bearings 34 projects to carry a supporting wheel 12. The wheels 12 also serve as drive wheels for the weeder mechanism. The frame 10 is provided with a suitable hitch member 13 by means of which it may be drawn along the ground by a tractor, team, or other vehicle.

The frame 10 extends rearwardly at each end to provide support for two universal bearing boxes 14 from each of which a rotary rake shaft 15 extends inwardly toward the center of the machine.

The bearings 14 allow the shafts 15 to both rotate and to swing to various angles. At the middle of the frame, these shafts terminate in bearings carried in two hinged arms 16 which are hinged to the frame 10 upon suitable hinge bolts 17 at their forward extremities. The rear extremities of the arms 16 are supported upon trailing wheels 18. The rear of the frame 10, at each of its extremities, is also supported upon similar trailing wheels 19. The trailing wheels 18 and 19 are carried upon slotted, vertically adjustable wheel brackets 20, so that the height of the rake shafts 15, above the ground, can be regulated as desired at each extremity of each shaft.

The shafts 15 are driven by means of suitable sprocket chains 21 which extend from relatively small sprockets 22 on the axle stubs 23 to relatively large sprockets 24 on the rake shafts 15 so that the shafts 15 will rotate at a much slower speed than the wheels 12.

Each of the shafts 15 carries a cable drum consisting of a series of cable discs 25 keyed to the shaft and a series of spaced-apart, flexible cables 26 extend between the discs. The cables 26 are formed of a length to extend between the adjacent cable discs 25. At one extremity each of the cables is fastened into a half ball terminal 27 which rests in a ball socket 28 found in the cable disc. The other extremity of the cable terminates in a threaded terminal 29 for receiving a ball nut 30 which sets into the ball socket 28 in the opposite cable disc 25. This allows the cables to swing and bend without placing a sharp bend in the cable which would quickly cause it to break. The swinging motion is transmitted to the balls 27 causing them to rock or tilt in their ball sockets 28. This construction allows the proper tension to be placed in the cable and the cable to be quickly and easily removed by simply removing the nuts 30 so that the spacing around the drum may be changed as desired.

Figure 6:
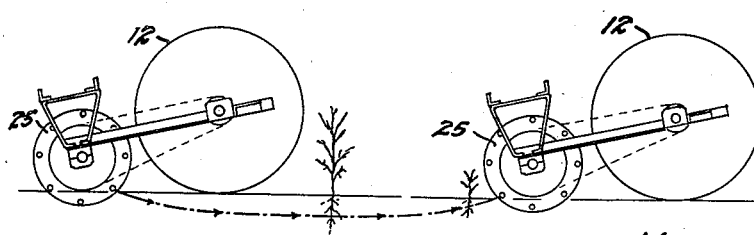
Fig. 6 is a diagrammatic view illustrating the line of travel of one of the weeding cables.

In use the device is drawn over the land to be cleared; the cable drums rotate at a slower speed than the machine is traveling over the ground. This causes each cable to descend into the ground (as shown at the left of Fig. 6) and to drag below the surface with a rake-like action so that it will engage the flexible roots below the surface and cause them to bend or wrap about the cable as the roots are pulled from the ground. The cable then slowly ascends from the ground (as shown at the right of Fig. 6) carrying the roots and weeds upward with it. The vibration and motion of the machine shake these weeds from the drums before they again descend into the ground, leaving them on the surface where they will quickly dry up.

It is desired to call attention to the fact that the machine is extremely wide, and it is unusual to find land so level that the cables would enter the ground uniformly throughout the entire width of the machine. This is overcome by dividing the shafts 15 into two independent shafts which are universally hinged at their outer extremities and carried by the hinged brackets 16 at their inner extremities. With this construction, if the ground is high at the middle of the machine the wheels 18 raise the inner extremities of the shafts 15 causing them to extend upwardly over the high point. If the ground is low at the midpoint, the wheels 18 drop into the hollow and allow the shafts 15 to extend downwardly. Strictly speaking, the chains and sprockets do not drive the cable drums, since the latter would be rotated by their contact with the ground. They simply act to retard the rotation of the cable drums to a slower peripheral speed than they are traveling over the ground.

The depth which the cable 26 travels below the surface can be regulated to suit the user by varying the positions of the wheel brackets 20.

Figure 5:
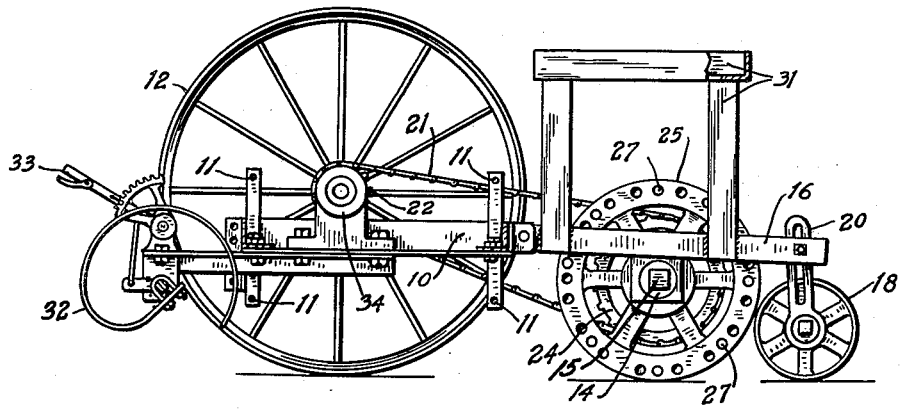
Fig. 5 is a "right" end elevation of the form of Fig. 4.

In the forms shown in Figs. 4 and 5, a weight platform 31 is mounted above each of the cable drums. Rocks, stones and other heavy material may be placed on this platform to force the cables below the ground surface in hard ground.

This form is also provided with a series of spring harrow teeth 32 which can be brought into contact with the ground by means of an adjusting lever 33, to break up hard surface crusts and loosen the weed roots so that the cables may more easily enter, engage and remove them.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. In a weeding machine of class described, a cable drum shaft; a cable drum surrounding said shaft; a universal bearing supporting one extremity of said shaft, so that the other extremity may rise and fall with the contour of the ground over which said machine is drawn.

2. In a weeding machine of class described, a cable drum shaft; a cable drum surrounding said shaft; a universal bearing supporting one extremity of said shaft; and a hinged bearing bracket supporting the other extremity of said shaft so that the latter extremity may rise and fall with the contour of the ground over which said machine is driven.

3. In a weeding machine of class described, a cable drum shaft; a cable drum surrounding said shaft; a universal bearing supporting one extremity of said shaft; a hinged bearing bracket supporting the other extremity of said shaft; and a ground engaging wheel supporting the free extremity of said hinged bearing bracket so as to raise and lower that extremity of the shaft in accord with the ground contour.

4. A weeding machine comprising: a relatively wide supporting frame; a shaft projecting from each extremity of said frame; a drive wheel mounted on each of said shafts to support said frame, said frame extending rearward from said drive wheels; adjustable follower wheels supporting the rearward extremity of said frame; a cable drum supported in said rearward extremity so that its lower periphery will enter the ground; means for driving said cable drum from said drive wheels at a slower speed of rotation than said drive wheels are rotating; and means for breaking the ground surface in advance of said drums.

5. In a weeding machine having a retarded, rotary drum positioned to drag through the ground surface at its face, means for allowing said drum to follow the contour of the ground comprising: a universal bearing for one extremity of said drum; and hinged bearing for the other extremity of said drum so as to allow the latter to rise and fall while rotating.

6. In a rotary weeding machine having a wheeled supporting frame, a universal shaft bearing at each extremity of said frame; a drum shaft extending inwardly from each universal bearing, said shafts being substantially in alignment with, yet independent of, each other; an independent bearing member supporting the inner extremity of each shaft, said bearing members being hinged to said frame at their one extremities so as to allow the inner extremities of said drum shafts to rise and fall.

7. In a rotary weeding machine having a wheeled supporting frame, a universal shaft bearing at each extremity of said frame; a drum shaft extending inwardly from each universal bearing, said shafts being substantially in alignment with, yet independent of, each other; an independent bearing member supporting the inner extremity of each shaft; hinges supporting one extremity of each bearing member; and an independent ground engaging wheel supporting the other extremity of each of said bearing members, said wheels acting to raise and lower the inner extremities of said shafts to correspond to the contour of the ground over which the weeder is drawn.

MELVIN M. SIMPSON.